United States Patent [19]
Alrey

[11] Patent Number: 6,068,220
[45] Date of Patent: May 30, 2000

[54] CABLE SUPPORT

[75] Inventor: David Alvin Alrey, Topeka, Kans.

[73] Assignee: PTMW Incorporated, Meriden, Kans.

[21] Appl. No.: 09/200,031

[22] Filed: Nov. 25, 1998

[51] Int. Cl.[7] .................................. F16L 3/00; F16L 3/22; E21F 17/02
[52] U.S. Cl. .............................. 248/49; 248/58; 248/68.1
[58] Field of Search ............................... 248/68.1, 58, 49; 174/135

[56] References Cited

U.S. PATENT DOCUMENTS 5,731,546  3/1998  Miles et al. ............................... 174/135

*Primary Examiner*—Ramon O. Ramirez
*Assistant Examiner*—David Heisey
*Attorney, Agent, or Firm*—J. David Wharton; Shook, Hardy & Bacon LLP

[57] ABSTRACT

A cable support that is an improved wire chase for supporting electrical and signal cables, particularly for railroad signal houses. The cable support has several side members between which run cross-support members that are riveted to the side members.

4 Claims, 2 Drawing Sheets

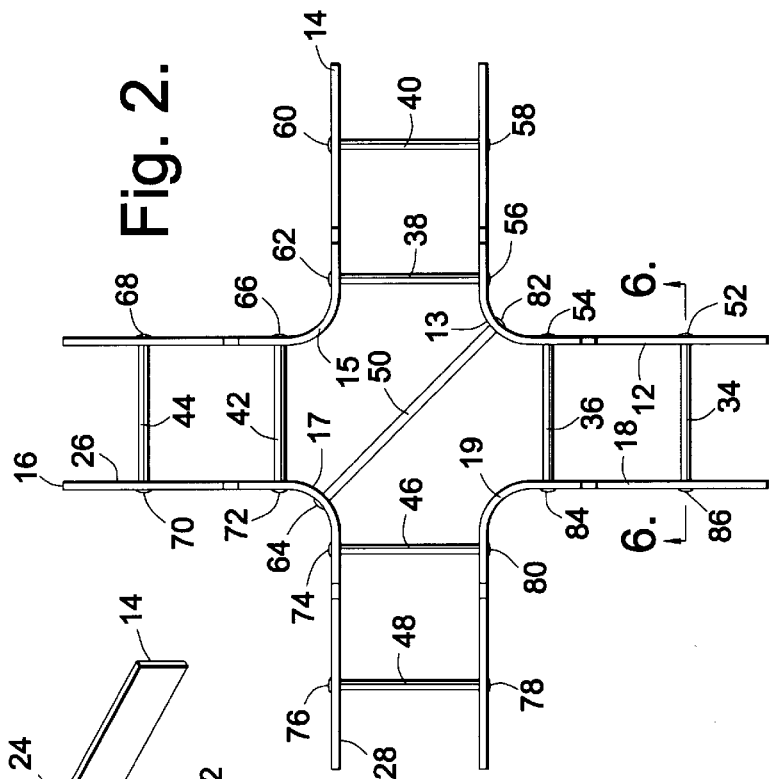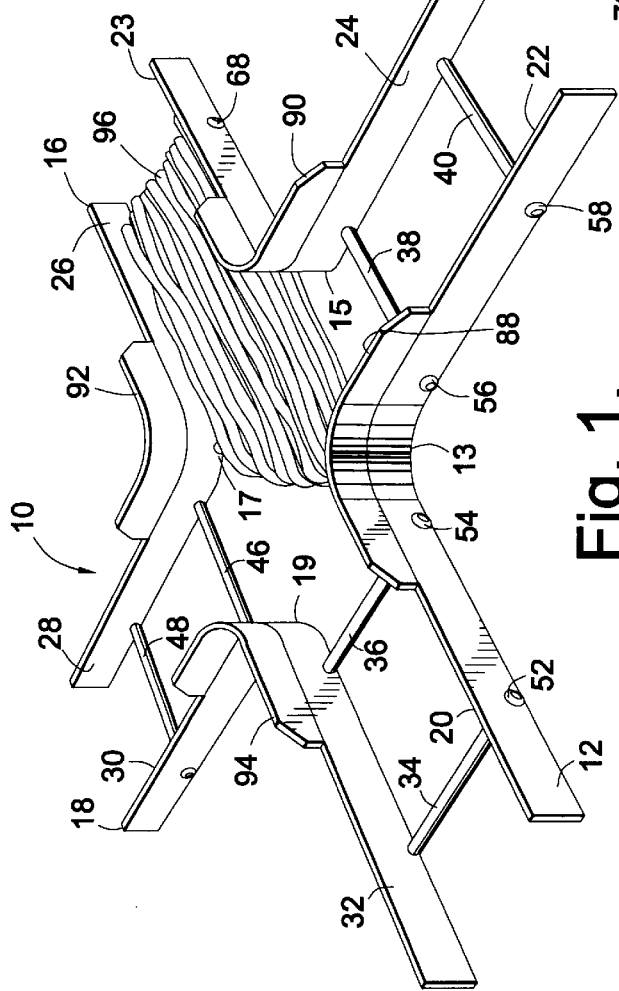

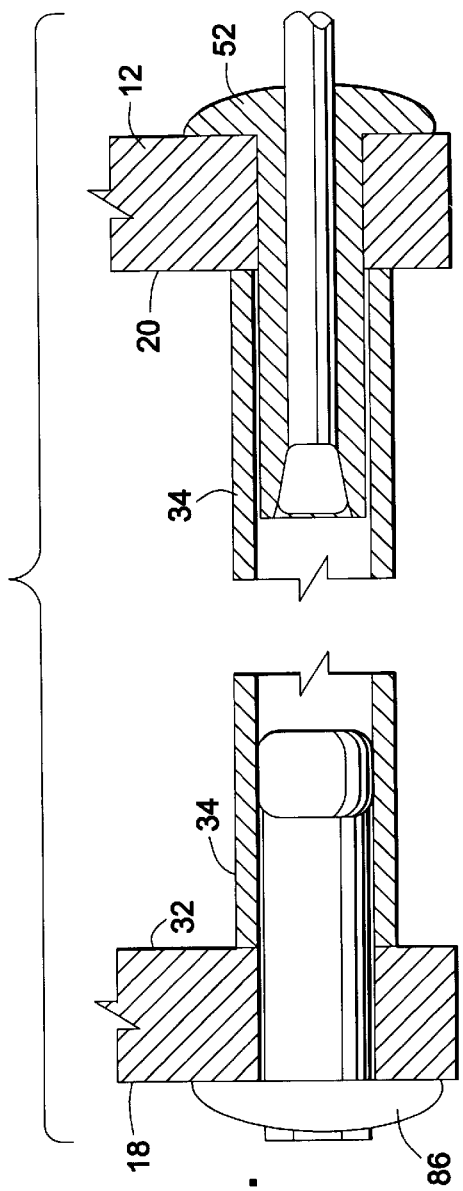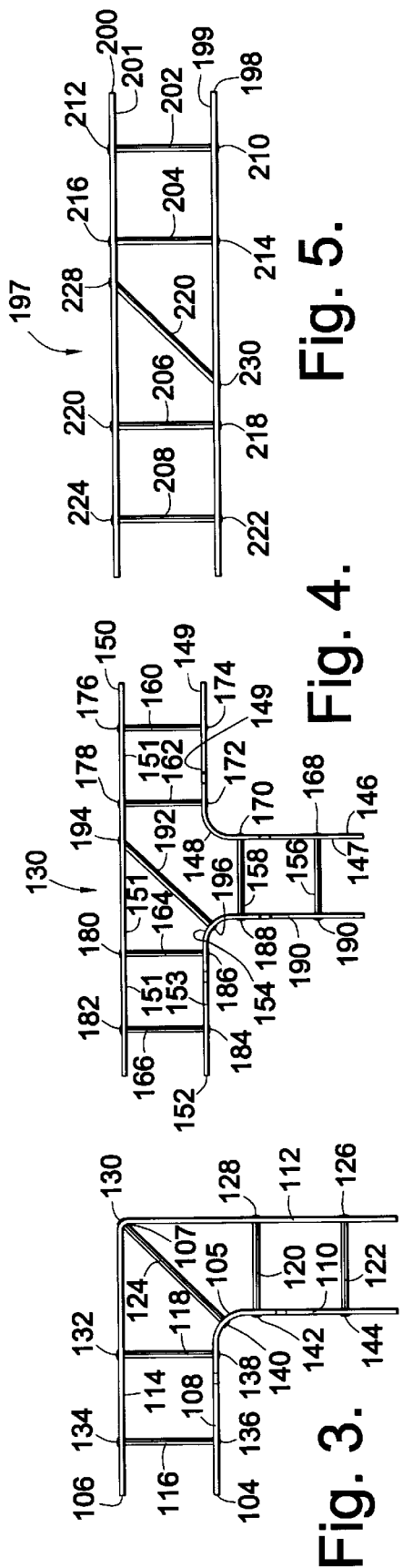

CABLE SUPPORT

BACKGROUND OF THE INVENTION

This invention relates to the field of cabling, more particularly, to a support for electrical and signaling cables.

Modern buildings contain numerous electrical and other control cables. While conduit is sometimes used to direct such cables, other means for directing wire along desired paths must often be used. For example, railroads have small buildings near crossings, switches, and yards to protect signaling equipment. Such buildings, or "signal houses," contain a great deal of wiring that requires a cable support or "wire chase" to keep the wires aligned and running in the correct direction. Numerous wire chase constructions have been developed. One arrangement known to those skilled in the art is a ladder-like structure formed of side members with cross-supports running perpendicular thereto that guide the wires or cabling resting on the cross-support member.

Presently, wire chase cross-supports are welded to their respective side members. This approach presents numerous problems. For example, welding the cross-supports typically creates undesired "splatter" that adheres to the wire chase forming an abrasive surface near the cable region. Cables that contact this surface are subject to wearing and tearing of their insulation. To avoid possible damage to the cables, the splatter must presently be ground off by hand, which is time-consuming and can leave rough edges on the wire chase that may damage the cables. Additionally, the welding operation itself can be time-consuming and require skilled labor.

To overcome these and other limitations of the prior art, an improved cable support is desirable that is easy and inexpensive to manufacture.

SUMMARY OF THE INVENTION

Accordingly, it is an object of the present invention to provide a cable support that is easier and less expensive to manufacture.

Another important object of the present invention is to provide a cable support that minimizes required welding and, accordingly, minimizes splatter requiring grinding that could leave rough surfaces.

It is a further object of the present invention to provide a cable support that minimizes the need for skilled labor during manufacturing.

According to the present invention, the foregoing and other objects are obtained by providing four side members, each being elongated and made from flat metal stock having a width. Each side member is bent along its longitudinal axis to form a bend zone and to define two flat surfaces disposed at an angle to one another. The side members are disposed in a cross-shaped arrangement so that respective flat surfaces of the side members oppose one another. Tubular-shaped cross-support members are disposed between opposing flat surfaces generally perpendicular to the respective side members. The cross-support members are likewise riveted to the respective side members. A diagonal support member is likewise provided disposed between two opposing bend zones and riveted to the respective side members. In the preferred embodiment, one or more side members can be furnished with a cable guide made of flat metal stock and bent at an angle substantially similar to the side members. The cable guides are coupled with a respective side member proximate the respective bend zone to thereby extend the width of the side member proximate the bend zone to better guide cabling in the cable support. In other embodiments, the cable support may be formed in a ladder-like, L-shaped or T-shaped configuration, each being constructed in a manner similar to that described above.

Additional objects, advantages and novel features of the invention will be set forth in part in the description that follows, and in part will become apparent to those skilled in the art upon an examination of the following, or may be learned by practicing the invention.

BRIEF DESCRIPTION OF THE DRAWINGS

FIG. 1 is a perspective view of a first embodiment of the invention showing cables supported thereon.

FIG. 2 is a top view of the cable support of the present invention.

FIG. 3 is a top view of a second embodiment of the present invention, showing an L-shaped configuration.

FIG. 4 is a top view of a third embodiment of the present invention, showing a T-shaped configuration.

FIG. 5 is a top view of a fourth embodiment of the present invention.

FIG. 6 is a partial side elevation view taken along line 6—6 of FIG. 2, showing the rivets and the side members broken away to show particular details of construction.

DETAILED DESCRIPTION OF THE PREFERRED EMBODIMENTS

Referring to the drawings in greater detail, a cable support 10 embodying the principles of the present invention is shown generally in FIG. 1. Cable support 10 is comprised of side members 12, 14, 16 and 18. These side members are preferably made from standard metal flat stock, each having a width. As can be seen in FIG. 1, each of side members 12, 14, 16 and 18 is generally elongated in shape and bent along its respective longitudinal axis. Specifically, side member 12 is bent along its longitudinal axis to define a bend zone 13. Side member 14 is bent along its longitudinal axis to define a bend zone 15. Side member 16 is bent along its longitudinal axis to define a bend zone 17, and side member 18 is bent along its longitudinal axis to define a bend zone 19.

In this configuration, each side member 12, 14, 16 and 18 presents two flat surfaces disposed at an angle to one another. As shown in FIG. 1, side member 12 has flat surface 20 and flat surface 22. Side member 14 has flat surface 24 and flat surface 25. Side member 16 has flat surface 26 and flat surface 28. Side member 18 has flat surface 30 and flat surface 32. The side members 12, 14, 16 and 18 are arranged in a cross-shaped formation such that respective flat surfaces are disposed opposing one another. Thus, in the preferred embodiment, side members 12 and 18 are disposed so that flat surface 20 and flat surface 32 oppose one another. Side members 12 and 14 are disposed so that flat surface 22 and flat surface 24 oppose one another. Side members 14 and 16 are disposed so that flat surface 25 and flat surface 26 oppose one another, and side members 16 and 18 are disposed so that flat surface 28 and flat surface 30 oppose one another.

Cross-member supports are coupled with the side members between respective opposing flat surfaces to provide support for cables. The cross-member supports are elongated, preferably being composed of standard metal tubular stock, capable of accepting a rivet on each end, as will be appreciated by those skilled in the art. As can be seen in FIGS. 1 and 2, cross-member supports 34 and 36 extend from flat surface 20 to flat surface 32. Cross-member supports 38 and 40 extend from flat surface 22 to flat surface 24.

Cross-member supports 42 and 44 extend from flat surface 25 to flat surface 26. Cross-member supports 46 and 48 extend from flat surface 28 to flat surface 30. The invention contemplates varying numbers of cross-support members extending between each respective pairs of opposing side members, including a single cross-member between each respective pair of opposing side members. When two or more cross-members are disposed between the same pair of opposing flat surfaces, such cross-members are preferably disposed in a spaced-apart, parallel relationship to one another.

Cross-members 34, 36, 38, 40, 42, 44, 46 and 48 are coupled with their respective side members noted above by a rivet as illustrated in FIGS. 1 and 2. As will be appreciated by those skilled in the art, the contemplated rivet is a standard rivet capable of being secured by a rivet gun or similar device. Thus, one end of cross-member support 34 is coupled to first side member 12 by rivet 52, and the other end of cross-member support 34 is coupled to side member 18 by rivet 86. One end of cross-member support 36 is coupled to side member 12 by rivet 54, and the other end of cross-member support 36 is coupled to side member 18 by rivet 84. One end of cross-member support 38 is coupled to side member 12 by rivet 56, and the other end of cross-member support 38 is coupled to side member 14 by rivet 62. One end of cross-support member 40 is coupled to side member 12 by rivet 58, and the other end of cross-member support 40 is coupled to side member 14 by rivet 60. One end of cross-support member 42 is coupled to side member 14 by rivet 66, and the other end of cross-support member 42 is coupled to side member 16 by rivet 72. One end of cross-member support 44 is coupled to side member 14 by rivet 68, and the other end of cross-member support 44 is coupled to side member 16 by rivet 70. One end of cross-support member 46 is coupled to side member 16 by rivet 74, and the other end of cross-support member 46 is coupled to side member 18 by rivet 80. One end of cross-support member 48 is coupled to side member 16 by rivet 76, and the other end of cross-support member 48 is coupled to side member 18 by rivet 78.

An elongated diagonal support member is preferably provided to support cabling running downwardly into an area. The diagonal support member is preferably composed of standard tubular metal stock, capable of accepting a rivet on each end. As shown in FIGS. 1 and 2, a diagonal support member 50 is disposed between bend zone 13 and bend zone 17. Diagonal support member 50 is coupled with side member 16 by rivet 64 and with side member 12 by rivet 82. The present invention likewise contemplate that diagonal support member 50 could be disposed between bend zone 15 and bend zone 19.

In the preferred embodiment, side members 12, 14, 16 and 18 are each furnished with a cable guide coupled parallel with the respective side member proximate the bend zone of the respective side member to thereby extend the width of the side member proximate the respective bend zone. The cable guides are preferably composed of a standard flat metal stock bent at an angle substantially similar to that of the angle of the bend zone in the side members. Thus, as shown in FIG. 1, cable guide 88 is coupled with side member 12 proximate bend zone 13. Cable guide 90 is coupled with side member 14 proximate bend zone 15. Cable guide 92 is coupled with side member 16 proximate bend zone 17. Cable guide 94 is coupled with side member 18 proximate bend zone 19. Each of the cable guides 88, 90, 92, and 94 can serve to better guide cables 96 along cable support 10. Cable guides 88, 90, 92 and 94 may be coupled with the respective side member by means of welding.

FIG. 6 is a cross-sectional view taken along line 6—6 of FIG. 2 further showing, how the cross-support members of the invention are riveted to a respective side member. By way of illustration, rivet 52 passes through an aperture in side member 12 to secure cross-support member 34 to side member 12. Rivet 86 passes through an aperture in side member 32 to secure cross-support member 34 to side member 32.

In operation, cable support 10 is coupled with a building or other housing at a desired location therein. Cables 96 are trained over cross-support members 42 and 44 or others and downwardly over diagonal member support 50 to guide and support cables 95 from one desired location to another.

FIG. 3 shows another cable support embodying the principals of the, present invention. In this embodiment, cable support 102 is formed generally in a L-shape. Cable support 102 is comprised of side member 104 and side member 106, each bent along its respective longitudinal axis to define, respectively, a bend zone 105 and a bend zone 107. The side members are composed of a standard flat stock, each bent at an angle to define a bend zone and two flat surfaces disposed at an angle to one another. As shown in FIG. 3, side member 104 has flat surface 108 and flat surface 110. Side member 106 has flat surface 112 and flat surface 114. Side members 104 and 106 are disposed in a L-shape arrangement such that respective flat surfaces are disposed opposing one another. Thus, in the preferred embodiment, side members 104 and 106 are disposed so that flat surface 110 and flat surface 112 oppose one another and that flat surface 108 and flat surface 114 oppose one another.

Cross-support members are coupled with the side members between respective opposing flat surfaces to provide support for cables. As noted above, the cross-support members are elongated, preferably being composed of standard metal tubular stock, capable of accepting a rivet on each end as will be appreciated by those skilled in the art. As can be seen in FIG. 3, cross-support members 116 and 118 extend from flat surface 108 to flat surface 114. Cross-support members 120 and 122 extend from flat surface 110 to flat surface 112. This embodiment of the invention contemplates varying numbers of cross-support members extending between each respective pair of opposing side members, including a single cross-member between each respective pair of opposing side members. When two or more cross-members are disposed between the same pair of flat surfaces, such cross-members are preferably disposed in a spaced-apart, parallel relationship to one another.

Cross-members 116, 118, 121 and 122 are coupled with their respective side members noted above by a rivet as described above in the embodiment illustrated in FIG. 1. Specifically, one end of cross-member support 116 is coupled to first side member 104 by rivet 136, and the other end of cross-member support 116 is coupled to side member 106 by rivet 134. On end of cross-member support 118 is coupled to side member 104 by rivet 138, and the other end of cross-member support 118 is coupled to side member 106 by rivet 132. One end of cross-member support 120 is coupled to side member 104 by rivet 142, and the other end of cross-member support 120 is coupled to side member 106 by rivet 128. One end of cross-support member 122 is coupled to side member 104 by rivet 144, and the other end of cross-member support 122 is coupled to side member 106 by rivet 126. This embodiment also contemplates an elongated diagonal support member to support cabling running downwardly into an area, similar to that described above for diagonal support member 50. As shown in FIG. 3, a diagonal support member 124 is disposed between bend zone 105 and bend zone 107. Diagonal support member 124 is coupled to first side member by 104 by rivet 140 and to second side member 106 by rivet 130. In the preferred embodiment, side members 104 and 106 are each furnished with a cable guide coupled parallel with their respective side members proximate the bend zone of the respective side members to thereby extend the width of the side member proximate the respective bend zone similar to cable guides 88, 90, 92 and 94 shown in FIG. 1. It is to be understood that this embodiment contemplates a cable guide proximate bend zones 105 and 107 of the same type as cable guides 88, 90, 92 and 94 as shown in FIG. 1. This embodiment of the invention operates as described above for the embodiment shown in FIGS. 1 and 2.

FIG. 4 shows another cable support embodying the principles of the present invention. In this embodiment, a cable support 145 is formed generally in a T-shape. Cable support 145 is comprised of side members 146, 150 and 152. Each side member is composed of standard metal flat stock, each having a width. Side member 146 is bent along its longitudinal axis to define a bend zone 148. Side member 152 is bent along its longitudinal axis to define a bend zone 154.

In this configuration, side members 146, 150 and 152 present flat surfaces. Side member 146 has flat surface 147 and flat surface 149. Side member 150 has flat surface 151. Side member 152 has flat surface 153 and flat surface 155. Flat surface 147 and flat surface 149 are disposed at an angle to one another. Flat surface 153 and flat surface 155 are disposed at an angle to one another. The side members 146, 150 and 152 are disposed in a T-shaped arrangement such that respective flat surfaces are disposed opposing one another. Thus, in the preferred embodiment, side member 146 and side member 150 are disposed so that flat surface 149 and flat surface 151 oppose one another. Side member 150 and side member 152 are disposed so that flat surface 151 and flat surface 153 oppose one another, and side member 152 and 146 are disposed so that flat surface 155 and flat surface 147 oppose one another. Cross-support members of the type described above are coupled with the side members between respective opposing flat surfaces to provide support for cables. As can be seen in FIG. 4, cross-support members 156 and 158 extend from flat surface 147 to flat surface 155. Cross-support members 160 and 162 extend from flat surface 149 to flat surface 151. Cross-support members 164 and 166 extend from flat surface 151 to flat surface 153. This embodiment of the invention contemplates varying numbers of cross-support members extending between respective pairs of opposing side members, including a single cross-member between each respective pair of opposing side members. When two or more cross-members are disposed between the same pair of opposing flat surfaces, such cross-members are preferably disposed and spaced apart, parallel with relationship to one another.

Cross-support members 156, 158, 160, 162, 164 and 166 are coupled with their respective side members noted above by a rivet as illustrated in FIG. 4. Specifically, one end of cross-support member 156 is coupled to side member 146 by rivet 168, and the other end of cross-support member 156 is coupled to side member 152 by rivet 190. One end of cross-support member 158 is coupled with side member 146 by rivet 170, and the other end of cross-support member 158 is coupled to side member 152 by rivet 188. One end of cross-support member 160 is coupled with side member 146 by rivet 174, and the other end of cross-support member 160 is coupled to side member 150 by rivet 176. One end of cross-support member 162 is coupled with side member 146 by rivet 172, and the other end of cross-support member 162 is coupled to side member 150 by rivet 178. One end of cross-support member 164 is coupled to side member 150 by rivet 180, and the other end of cross-support member 164 is coupled to side member 152 by rivet 186. One end of cross-support member 166 is coupled to side member 150 by rivet 182, and the other end of cross-support member 166 is coupled to side member 152 by rivet 184.

An elongated diagonal support member is preferably provided to furnish support for cabling running downwardly into an area, similar to that described above for diagonal support 50. As shown in FIG. 4, a diagonal support member is disposed between bend zone 154 and side member 150. One end of diagonal support member 192 is coupled to side member 150 by rivet 194, and the other end of diagonal support member 192 is coupled to side member 152 by rivet 196. In the preferred embodiment, side members 146 and 152 may be furnished with a cable guide coupled parallel with their respective side member proximate the bend zone of the respective side member to thereby extend the width of the side member proximate the respective bend zone similar to that shown in FIG. 1. It is to be understood that this embodiment of the invention contemplates a cable guide proximate bend zones 148 and 154 of the same type as cable guides 88, 90 92 and 94 as shown in FIG. 1.

FIG. 5 shows another cable support embodying the principles of the present invention. In this embodiment, cable support 197 is formed generally in a ladder-shape configuration. Cable support 197 is comprised of side member 198 and side member 200, each disposed in generally parallel opposing relationship to one another, generally as described above for the embodiment shown in FIGS. 1 and 2. In this configuration, each side member presents a flat surface. As shown in FIG. 5, side member 198 has flat surface 199, and side member 200 has flat surface 201. Cross-support members are coupled with the side members between opposing flat surfaces 199 and 201 to provide support for cables. The cross-members supports are elongated, preferably in the form described above for other embodiments. As can be seen in FIG. 5, cross-support members 202, 204, 206 and 208 extend from flat surface 199 to flat surface 201. This embodiment of the invention contemplates varying numbers of cross-support members extending between each opposing side-member, including a single cross-member between the opposing side members. When two or more cross-suppport members are disposed between the flat surfaces 199 and 201, such cross-members are preferably disposed in a spaced apart, parallel relationship to one another.

Cross-support members 202, 204, 206 and 208 are coupled with their respective side members noted above by a rivet as illustrated in FIG. 5. Thus, one end of cross-support member 202 is coupled with side member 198 by means of rivet 210, and the other end of cross-support member 202 is coupled to side member 200 by means of rivet 212. One end of cross-support member 204 is coupled to side member 198 by means of rivet 214, and the other end of cross-support member 204 is coupled to side member 200 by means of rivet 216. One end of cross-support member 206 is coupled to side member 198 by means of rivet 218 and to side member 200 by means of rivet 220. One end of cross-support member 208 is coupled to side member 198 by means of rivet 222, and the other end of cross-support member 208 is coupled to side member 200 by means of rivet 224.

An elongated diagonal support member is preferably provided to furnish support for cabling running downwardly into an area similar to that described for diagonal member 50. As shown in FIG. 5, a diagonal support member 220 is disposed at an angle between side member 198 and side member 200. Diagonal support member 220 is coupled with side member 198 by rivet 230 and with side member 200 by rivet 228.

From the foregoing, it will be seen that this invention is one-well adapted to attain all the ends and objects hereinabove set forth together with the other advantages which are obvious which are inherent to the structure. It will be understood that certain features and subcombinations are of utility and may be employed without reference to other features and subcombinations. This is contemplated by, and is within the scope of, the claims. Since many possible embodiments may be made of the invention without departing from the scope thereof, it is understood that all matter herein set forth or shown in the accompanying drawings is to interpreted as illustrative, and not in a limiting sense.

I claim:

1. A cable support, comprising:

a first side member, said first side member having a first width and being bent along its longitudinal axis to define a first bend zone, a first flat surface and a second flat surface, wherein said first flat surface and said second flat surface are disposed at an angle to one another;

a first cable guide couple with said first side member, said first cable guide being elongated and coupled parallel with said first side member proximate said first bend zone to thereby extend said first width proximate said first bend zone;

a second side member, said second side member having a second width and being bent along its longitudinal axis to define a second bend zone, a third flat surface and a fourth flat surface, wherein said third flat surface and said fourth flat surface are disposed at an angle to one another;

a third side member, said third side member having a third width and being bent along its longitudinal axis to define a third bend zone, a fifth flat surface and a sixth flat surface, wherein said fifth flat surface and said sixth flat surface are disposed at an angle to one another;

a fourth side member, said fourth side member having a fourth width and being bent along its longitudinal axis to define a fourth bend zone, a seventh flat surface and an eight flat surface, wherein said seventh flat surface and said eighth flat surface are disposed at an angle to one another;

wherein said first side member, said second side member, said third side member and said fourth side member are disposed proximate one another so that said first flat surface and said eight flat surface oppose one another, said second flat surface and said third flat surface oppose one another, said fourth flat surface and said fifth flat surface oppose one another and said sixth flat surface and said seventh flat surface oppose one another;

a first cross-member, said first cross-member being elongated and tubular in shape and extending between said first flat surface and said eighth flat surface, wherein one end of said first cross-support member is coupled to said first member by a rivet and another end of said first cross-support member is coupled to said fourth side member by a rivet;

a second cross-support member, said second cross-support member being elongated and tubular in shape and extending between said second flat surface and said third flat surface, wherein one end of said second cross-support member is coupled to said first side member by a rivet and another end of said cross-support member is coupled to said second side member by a rivet;

a third cross-support member, said third cross-support member being elongated and tubular in shape and extending between said fourth flat surface and said fifth flat surface, wherein one end of said third cross-support member is coupled to said second side member by a rivet and another end of said third cross-support member is coupled to said third side member by a rivet;

a fourth cross-support member, said fourth cross-support member being elongated and tubular in shape and extending between said sixth flat surface and said seventh flat surface, wherein one end of said fourth cross-support member is coupled to said fourth side member by a rivet and another end of said fourth cross-support member is coupled to said first side member by a rivet; and a diagonal support member, said diagonal support member being elongated and tubular in shape and extending between said first bend zone and said third bend zone, wherein one end of said diagonal support member is coupled with said first side member by a rivet and another end of said diagonal Support member is coupled with said third side member by a rivet.

2. The cable support of claim 1, further comprising:

a second cable guide, coupled with said second side member, said second cable guide being elongated and coupled parallel with said second side member proximate said second bend zone to thereby extend said second width proximate said second bend zone;

a third cable guide coupled with said third side member, said third cable guide being elongated and coupled parallel with said third side member proximate said third bend zone to thereby extend said third width proximate said third bend zone; and a fourth cable guide coupled with said fourth side member, said fourth cable guide being elongated and coupled parallel with said fourth side member proximate said fourth bend zone to thereby extend said fourth width proximate said fourth bend zone.

3. A cable support, comprising:

a first side member, said first side member having a first width and being bent along its longitudinal axis to define a first bend zone, a first flat surface and a second flat surface, wherein said first flat surface and said second flat surface are disposed at an angle to one another;

a cable guide coupled with said first side member, said cable guide being elongated and coupe parallel with said first side member proximate said first bend zone to thereby extend said first width proximate said first bend zone;

a second side member, said second side member having a second width and being bent along its longitudinal axis to define a second bend zone, a third flat surface and a fourth flat surface, wherein said third flat surface and said fourth flat surface are disposed at an angle to one another;

wherein said first side member and said second side member are disposed proximate one another so that said first flat surface and said fourth flat surface oppose one another and said second flat surface and said third flat surface oppose one another;

a first cross-support member, said first cross-support member being elongated and tubular in shape and extending between said first flat surface and said fourth flat surface, wherein one end of said first cross-support member is coupled to said first side member by a rivet and another end of said first cross-support member is coupled to said second side member by a rivet;

a second cross-support member, said second cross-support member being elongated and tubular in shape and extending between said second flat surface and said third flat surface, wherein one end of said second cross-support member is coupled to said first side, member by a rivet and another end of said cross-support member is coupled to said second side member by a rivet; and a diagonal support member, said diagonal support member being elongated and tubular in shape and extending between said first bend zone and said second bend zone, wherein one end of said diagonal support member is coupled with said first side member by a rivet and another end of said diagonal support member is coupled with said second side member by a rivet.

4. A cable support, comprising:

a first side member, said first side member having a first width and being bent along its longitudinal axis to define a first bend zone, a first flat surface and a second flat surface, wherein said first flat surface and said second flat surface are disposed at an angle to one another;

a cable guide coupled with said third side member, said cable guide being elongated and coupled parallel with said third side member proximate said second bend zone to thereby extend said second width proximate said second bend zone;

a second side member, said second side member presenting a third flat surface;

a third side member, said third side member having a second width and being bent along, its longitudinal axis to define a second bend zone, a fourth flat surface and a fifth flat surface, wherein said fourth flat surface and said fifth flat surface are disposed at an angle to one another;

wherein said first side member, said second side member and said third side member are disposed proximate one another so that said first flat surface and said fifth flat surface oppose one another, said second flat surface and said third flat surface oppose one another and said third flat surface and said fourth flat surface oppose one another;

a first cross-support member, said first cross-support member being elongated and tubular in shape and extending between said first flat surface and said fifth flat surface, wherein one end of said first cross-support member is coupled to said first side member by a rivet and another end of said first cross-support member is coupled to said third side member by a rivet;

a second cross-support member, said second cross-support member being elongated and tubular in shape and extending between said second flat surface and said third flat surface, wherein one end of said second cross-support member is coupled to said first side member by a rivet and another end of said cross-support member is coupled to said second side member by a rivet;

a third cross-support member, said third cross-support member being elongated and tubular in shape and extending between said third flat surface and said fourth flat surface, wherein one end of said third cross-support member is coupled to said second side member by a rivet and another end of said third cross-support member is coupled to said third side member by a rivet; and a diagonal support member, said diagonal support member being elongated and tubular in shape and extending between said second bend zone and said second side member, wherein one end of said diagonal support member is coupled with said third side member by a rivet and another end of said diagonal support member is coupled with said second side member by a rivet.

* * * * *